(12) United States Patent
Flinker (10) Patent No.: US 12,072,122 B2
(45) Date of Patent: Aug. 27, 2024

(54) VACUUM COOLING SYSTEM AND METHOD

(71) Applicant: NOH5 Cooling Pty. Ltd., Kew (AU)

(72) Inventor: Maxwell David Flinker, Kew (AU)

(73) Assignee: NOH5 Cooling Pty. Ltd., Kew (AU)

( * ) Notice: Subject to any disclaimer, the term of this patent is extended or adjusted under 35 U.S.C. 154(b) by 339 days.

(21) Appl. No.: 17/618,393

(22) PCT Filed: Jun. 11, 2020

(86) PCT No.: PCT/AU2020/000048
§ 371 (c)(1),
(2) Date: Dec. 10, 2021

(87) PCT Pub. No.: WO2020/248003
PCT Pub. Date: Dec. 17, 2020

(65) Prior Publication Data
US 2022/0221169 A1 Jul. 14, 2022
US 2023/0060116 A2 Feb. 23, 2023

(30) Foreign Application Priority Data

Jun. 13, 2019 (AU) .............................. 2019902061

(51) Int. Cl.
*F24F 5/00* (2006.01)
*F25D 31/00* (2006.01)
*F25B 15/04* (2006.01)

(52) U.S. Cl.
CPC ............ *F24F 5/0035* (2013.01); *F25D 31/00* (2013.01); *F25B 15/04* (2013.01)

(58) Field of Classification Search
CPC .. F24F 5/0035; F25D 31/00; F25D 2323/061; F25B 15/04; F25B 25/005; F25B 2400/23
See application file for complete search history.

(56) References Cited

U.S. PATENT DOCUMENTS 2,295,462 A * 9/1942 Forman ................ F24F 5/0007
62/169
5,186,242 A * 2/1993 Adachi ................ F28D 7/0033
165/110

(Continued)

FOREIGN PATENT DOCUMENTS

DE 4036854 C1 * 5/1992
DE 102015112432 A1 * 2/2017

(Continued)

OTHER PUBLICATIONS

DE-4036854-C1 Translation (Year: 1992).*

(Continued)

*Primary Examiner* — David J Teitelbaum
(74) *Attorney, Agent, or Firm* — Baker Donelson; Carl M. Davis, II (57) ABSTRACT

A vacuum cooling system (10) having a first fluid (21) and a second fluid (70) circulating through the system (10) in separate cycles, said system (10) including a vacuum chamber (1) containing a portion (14) of said first fluid and a volume of gas (42) evaporated from said first fluid portion (14), a first pump means (7) for removing the gas volume (42) from the vacuum chamber (1) to create a vacuum in said vacuum chamber (1), a means for moving (8) said first fluid (21) into said vacuum chamber (1) to replenish the first fluid portion (14) in said vacuum chamber (1), and heat exchanger means (2) for cooling said second fluid (70) over which air is blown in order to cool air in a space.

19 Claims, 3 Drawing Sheets

(56) References Cited

U.S. PATENT DOCUMENTS

2008/0302121 A1    12/2008   Lindauer
2019/0113259 A1*   4/2019   Levin .................... F25B 17/086
2019/0293302 A1*   9/2019   Van ......................... F24D 1/005

FOREIGN PATENT DOCUMENTS

GB        2095386 A  *  9/1982  ............. F25B 17/02
KR   20170043331 A     4/2017
WO    2013098950 A1    7/2013

OTHER PUBLICATIONS

GB-2095386-A Translation (Year: 1982).*
DE-102015112432-A1 Translation (Year: 2017).*
International Search Report. PCT/AU2020/000048, Aug. 3, 2020, 4 pages.
International Preliminary Report on Patentability, PCT/AU2020/000048, May 4, 2021, 14 pages.

* cited by examiner

FIG. 1

Boiling Point of Water at Various Vacuum Levels

| Temp. F | Temp. C | Microns | Inches of HG Vacuum | Pressure PSIA |
|---|---|---|---|---|
| 212 | 100 | 759,968 | 0.00 | 14.696 |
| 205 | 96.11 | 535,000 | 4.92 | 12.279 |
| 194 | 90 | 525,526 | 9.23 | 10.162 |
| 176 | 80 | 355,092 | 15.94 | 6.866 |
| 158 | 70 | 233,680 | 20.72 | 4.519 |
| 140 | 60 | 149,352 | 24.04 | 2.888 |
| 122 | 50 | 92,456 | 26.28 | 1.788 |
| 104 | 40 | 55,118 | 27.75 | 1.066 |
| 86 | 30 | 31,750 | 28.67 | 0.614 |
| 80 | 26.67 | 25,400 | 28.92 | 0.491 |
| 76 | 24.44 | 22,860 | 29.02 | 0.442 |
| 72 | 22.22 | 20,320 | 29.12 | 0.393 |
| 69 | 20.56 | 17,780 | 29.22 | 0.344 |
| 64 | 17.78 | 15,240 | 29.32 | 0.295 |
| 59 | 15 | 12,700 | 29.42 | 0.246 |
| 53 | 11.67 | 10,160 | 29.52 | 0.196 |
| 45 | 7.22 | 7,620 | 29.62 | 0.147 |
| 32 | 0 | 4,572 | 29.74 | 0.088 |
| 21 | -6.11 | 2,540 | 29.82 | 0.049 |
| 6 | -14.44 | 1,270 | 29.87 | 0.0245 |
| -24 | -31.11 | 254 | 29.91 | 0.0049 |
| -35 | -37.22 | 127 | 29.9150 | 0.00245 |
| -60 | -51.11 | 25.40 | 29.9190 | 0.00049 |
| -70 | -56.67 | 12.70 | 29.9195 | 0.00024 |
| -90 | -67.78 | 2.54 | 29.9199 | 0.00005 |
| -- |  | 0.00 | 29.9200 | 0.000000 |

FIG. 4

VACUUM COOLING SYSTEM AND METHOD

FIELD OF THE INVENTION

This invention relates to a vacuum cooling system and method and more particularly to a cooling system and method that uses a vacuum pump to evacuate a gas from a chamber, which has the effect of cooling the remaining fluid in the chamber to use for cooling a defined space.

BACKGROUND OF THE INVENTION

There are three common thermodynamic cycles that can be used for cooling a bounded space. The first of these is called either adsorption cooling or absorption cooling. In both cases the cooling system uses various types of mixtures where one component called the absorbent combines with another component called the absorbate. Adsorption is a surface process involving ions or atoms of the absorbate reacting with the surface of the absorbent, whilst absorption involves two liquids mixing to form a bond. Heat is applied to the combination which releases the absorbate in the form of a gas which is subsequently cooled to ambient temperature and then becomes a liquid. The liquid is then exposed to a vacuum and evaporates, drawing heat from its surroundings. The gas is then exposed to the absorbent, which recombines with it, allowing the cycle to be repeated. Absorption chillers are used for refrigeration and were popular in early modern fridges whilst adsorption cooling has been used for solar air-conditioners. In both cases the COP (co-efficient of performance) is very low and as a result their use is not widespread for domestic cooling applications.

A further type of air-conditioning system in use is evaporative air-conditioning. This is where warm air from outside a building is drawn through water soaked media which causes the water to evaporate. This cools the air which is then pumped around the inside of the building and replaces the hot air with cool moist air. It is an open loop system and there is a high usage of water during the operation of the air-conditioning. It is only effective if the external air is dry and not humid. Humid conditions mean that the air cannot cause the water to evaporate which greatly reduces the cooling effect. These sorts of air-conditioning units are relatively inexpensive and efficient, however they require regular maintenance which if not done, can lead to the development of dangerous mould and bacteria in the system.

A third type of air-conditioning system uses vapour compression cooling. This is where a refrigerant gas is compressed and cooled to a liquid and then expanded back to a gas in a heat exchanger inside the home or dwelling. This cools the air inside the home or dwelling. Such units are the most commonly used, however they are relatively expensive although they do have reasonable COP figures. The refrigerants used are usually hydrofluorocarbons, such as R-134A, which has a fairly low Latent Heat of Vaporization of 216.97 kj/kg. By contrast water's Latent Heat of Vaporization is 2260.0 KJ/kg which means a large volume of gas must pass through the inroom heat exchanger to get a significant cooling effect. As a result energy to drive the compressor unit is relatively high.

Figure 4:
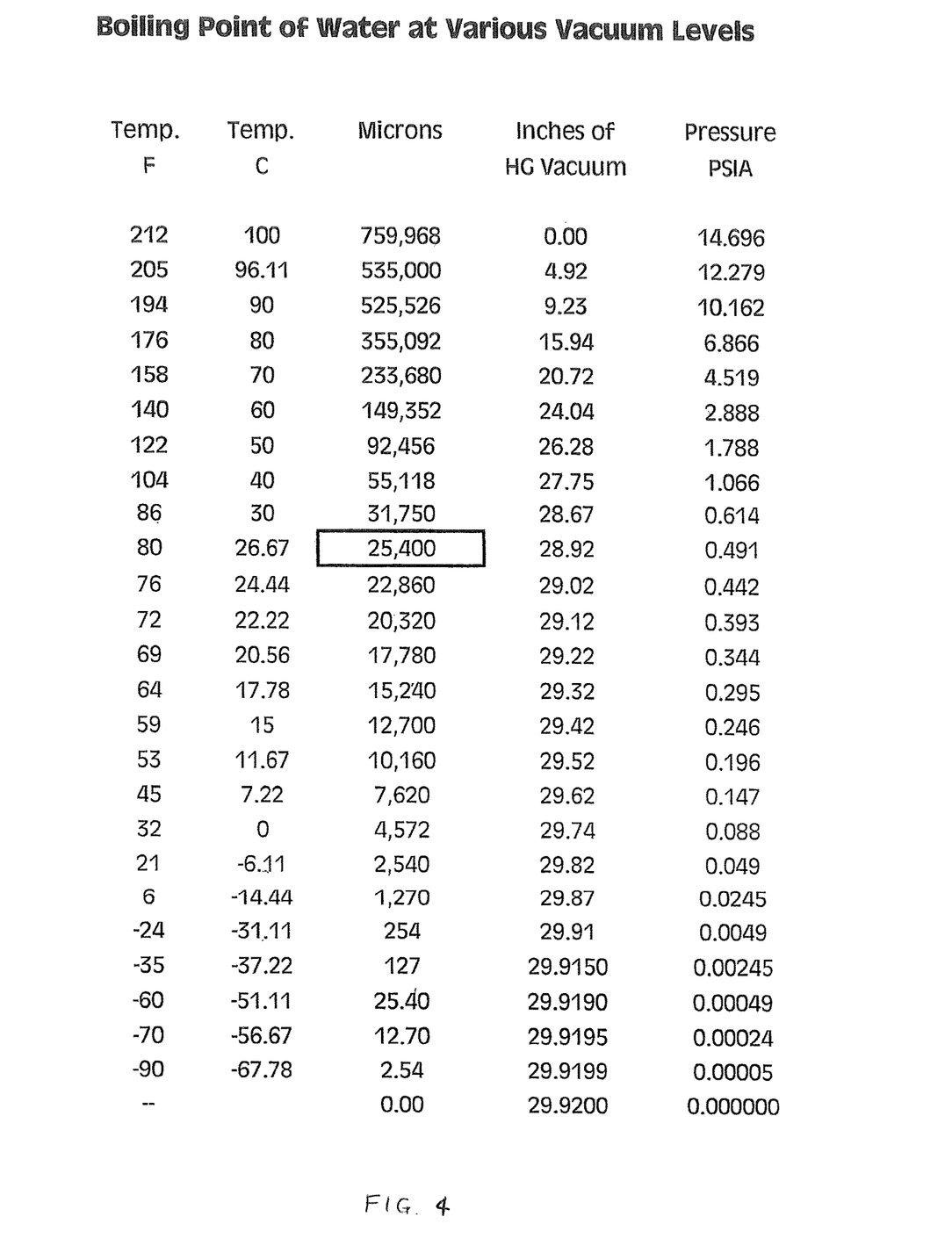
FIG. 4 is a table showing the boiling point of water at various vacuum levels.

There have been several attempts at systems which inject water into a vacuum where it can evaporate and produce a cooling effect. In principle, water in a vacuum can be made to boil at low temperatures. A vacuum cooling system exploiting the boiling of water in a vacuum is used to cool or freeze high water content leafy produce, such as lettuce. An hermetically sealed container is loaded with the product evacuated below 29.74 inHg (0.088 psia) at which point the moisture in the vegetable matter will freeze. From the Table in FIG. 4, which shows the boiling point of water at various vacuum levels, it shows the freezing temperature of water being zero degrees Celsius occurring at a pressure of 0.088 psia. The vacuum pumps required to achieve this level are complex Liquid Ring or Rotary Vane Pumps which are very expensive and require careful maintenance of their lubrication systems and seals. Scaled down versions of these pumps, commonly used in laboratory work, are also very expensive and are not designed to support the types of flow rates required for air-conditioning purposes.

Disclosed in U.S. Pat. No. 3,563,049 there is an aspirator or venturi pump which is used to create a vacuum in a chamber containing water. Water is used as the motive fluid for the aspirator, however the best vacuum that can be pulled by a water powered venturi is about 29 inHg which limits the cooling effect to a temperature of about 25° C. which is not enough for effective air-conditioning. As the water needs to be compressed to about 35 psig it will heat up before entering the venturi which dramatically reduces the suction pressure.

In U.S. Pat. No. 4,723,415 there is described a spray system inside a chamber which is said to assist with increasing the evaporation rate of the water in a vacuum tank. Water is sprayed through a header 22 and condenses in a main water body in the vacuum tank where it is said that a partial vacuum is maintained within the tank with the result that some of the water spray evaporates or boils at approximately 45°F or 7.2° ° C. The main water is chilled and is then directed through a cooling coil 28 over which air is blown. The air gives up heat to the chilled water so that the temperature of the air is lowered to produce a cooling effect. The warmed water in the cooling coil is then directed back to the header 22 through a piping arrangement and a pump to thereby complete the cycle. The evaporating water absorbs heat from the main water supply of 14 which results in that main water supply being chilled to typically about 50° F. In the patent, the vacuum pump is not described in detail. A high vacuum, above 29 inHg, is required for any significant cooling of water to occur. Furthermore, this device will need an expensive high maintenance liquid ring or rotary vane pump, most of which are not designed for continuous use necessary for air conditioning. These types of pumps do not work well with water vapour in their gas streams and expensive purging systems would be needed that require regular maintenance, making such systems unsuitable for commercial, continuous use.

The above systems have a disadvantage in using a vacuum containing water as the basis for an air-conditioning system. The main barriers or difficulty is maintaining a high vacuum continuously coupled with the expense and maintenance issues related to the types of pumps that would be required.

The present invention seeks to overcome one or more of the above problems by providing a system and method of vacuum cooling using an alternative fluid combination for air-conditioning systems.

SUMMARY OF THE INVENTION

According to a first aspect of the invention, there is provided a vacuum cooling system having a first fluid and a second fluid circulating through the system in separate cycles, said system including:

a vacuum chamber containing a portion of said first fluid and a volume of gas evaporated from said first fluid portion;

first pump means for removing the gas volume from the vacuum chamber to create a vacuum in said vacuum chamber;

means for moving said first fluid into said vacuum chamber to replenish the first fluid portion in said vacuum chamber;

heat exchanger means for cooling said second fluid over which air is blown in order to cool the air in a space.

The system may further include dispersing means for atomising the first fluid to assist in creating the gas volume and evaporating the gas volume from the vacuum chamber.

The system may further include a baffle located in the interior of a vessel within the vacuum chamber, said baffle preventing atomised droplets of the first fluid from entering a conduit that connects the vacuum chamber to the first pump means, said conduit enabling the movement of the gas volume of the first fluid to the first pump means.

In a further embodiment the heat exchanger means can form part of said vacuum chamber. In another embodiment the heat exchanger means is separate and external to the vacuum chamber.

The means for moving is preferably a second pump means for pumping the first fluid into the vacuum chamber.

The first fluid portion may exit the vacuum chamber in a cooled state and enters the heat exchanger means to cool said second fluid.

The system may further include a mixing chamber located between the first pump means and the vacuum chamber for receiving said first fluid that passes through the heat exchanger means and for receiving the gas volume from the first pump means, said first fluid and said gas volume being mixed in said mixing chamber.

The second pump means is preferably located between an outlet of the mixing chamber and an inlet to the vacuum chamber. The system may further include a third pump means located between the vacuum chamber and the mixing chamber for moving said first fluid from said vacuum chamber to the mixing chamber. The system may further include a further or second heat exchanger means in the form of a radiator for receiving the second fluid which is cooled by the first fluid portion entering the heat exchanger means, wherein the cooled second fluid is passed through the radiator to cool said air in said space when air is fanned or blown over the radiator.

The system preferably includes a transfer pump means located between the radiator and the heat exchanger means for moving said cooled second fluid from said heat exchanger means and through said radiator. Preferably, under the action of the second pump means, the first fluid enters the vacuum chamber at said vacuum chamber inlet after leaving said outlet of the mixing chamber, wherein a portion of said first fluid is converted into a mixed fluid of droplets and a gas and then into said gas volume.

The gas volume in the vacuum chamber may be expelled through a first outlet of the vacuum chamber to enter an inlet to the first pump means, and thereafter proceeds through an outlet of the first pump means to be input to a first inlet of the mixing chamber to be mixed with the first fluid portion that exits through a second outlet of said vacuum chamber.

Preferably the first fluid portion leaves the vacuum chamber through said second outlet of said vacuum chamber in a cooled state and into a second inlet of the mixing chamber under the action of the third pump means.

In an embodiment, the second fluid circulates between the heat exchanger means and the radiator under the action of the transfer pump means, whereby said second fluid enters said heat exchanger means, is then cooled by the first fluid portion after exiting the second outlet of the vacuum chamber, and exits from the heat exchanger means to be received at an inlet to the radiator, thereafter said second fluid exits from an outlet to the radiator and enters an inlet to the transfer pump means and proceeds through an outlet of the transfer pump to the heat exchanger means to complete the cycle.

Preferably the first fluid is aqueous ammonia and when the first fluid enters the vacuum chamber the first fluid includes 25% ammonia or a similar fluid mixture containing a volatile component. Preferably the second fluid is water. Preferably the first fluid includes 10% to 40% ammonia or a fluid with other mixtures containing a volatile component.

According to a second aspect of the invention, there is provided a vacuum cooling method in a system having a vacuum chamber, heat exchanger means, first pump means, a first fluid and a second fluid circulating through the system, said second fluid moving in a cycle separate to that of the first fluid and the gas volume, said method including the steps of:

evaporating a portion of said first fluid in said vacuum chamber to produce a volume of gas inside said vacuum chamber;

operating said first pump means to remove said volume of gas from the vacuum chamber to create a vacuum in said vacuum chamber;

moving said first fluid into the vacuum chamber to replenish the first fluid portion in said vacuum chamber;

providing heat exchanger means to cool said second fluid over which air is blown in order to cool the air in a space.

The method may further include the step of withdrawing the first fluid portion from the vacuum chamber in a cooled state to enter the heat exchanger means to cool said second fluid.

The method may further include the step of providing a further heat exchanger means in the form of a radiator and circulating said second fluid between the heat exchanger means and the radiator, passing the cooled second fluid through the radiator to cool said air in said space.

BRIEF DESCRIPTION OF THE DRAWINGS

A preferred embodiment of the invention will hereinafter be described, by way of example only, with reference to the drawings in which.

DETAILED DESCRIPTION OF THE PREFERRED EMBODIMENTS

This invention involves using an evaporative fluid as the motive fluid which is formed of two components, with one more volatile than the other. Such an example is aqueous ammonia or $NH_4OH$. Ammonia in aqueous form is readily available and is a generally cheap substance to use. Ammonia has the second highest Latent Heat of Vaporization next to water, being 1371.2 kJ/kg. Latent Heat of Vaporization describes how much energy is required from a system for a phase change from liquid to gas.

Figure 1:
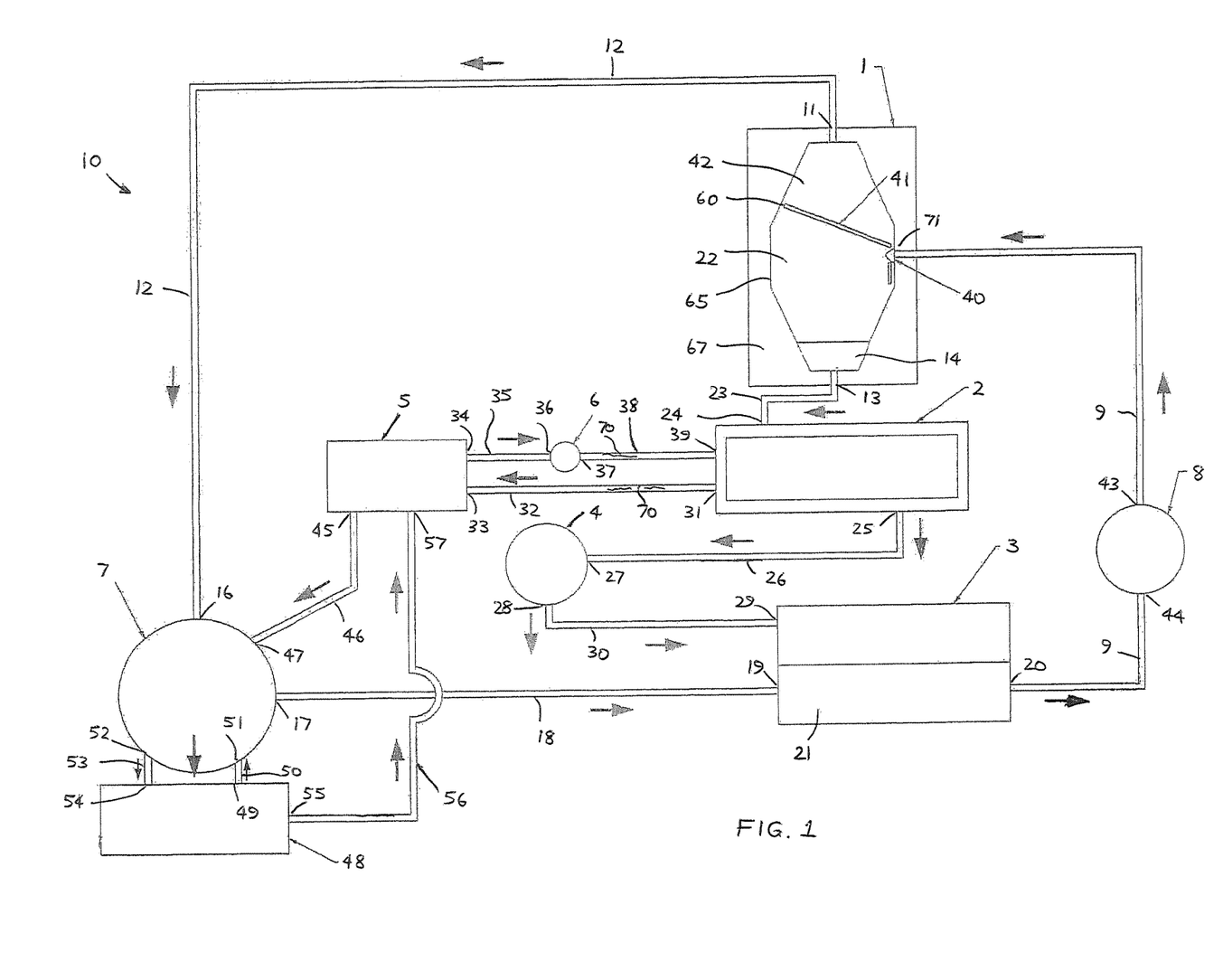
FIG. 1 is a block diagram showing an embodiment of a vacuum cooling system according to the invention.

Referring to FIG. 1, at reduced pressure, volatile gas from the first fluid input to vacuum chamber 1 is released from the chamber 1 removing sensible heat from the body of the liquid in the chamber 1 and cooling it so that it can be passed through a heat exchanger means 2, which cools a secondary fluid, preferably being water, that is then pumped into a second heat exchanger 5, such as a radiator, located in the space to be cooled. Air from the room is blown over heat exchanger 5 resulting in the cooling of the space. At the operating vacuum within the vacuum chamber 1 of about 25 inHg, the ammonia contained in the first fluid both boils and evaporates in various percentages dependent on the initial temperature of the first fluid when it enters the vacuum chamber 1.

The system 10 provides boiling/evaporation of the volatile component of the first fluid in a vacuum of up to 29inHg. In the case of 25% aqueous ammonia solution, being used as the first fluid, this vacuum will be around 25 inHg at normal ambient temperatures. If a more volatile mixture is used (higher percentage of volatile component) the operating vacuum in vacuum chamber 1 will be reduced depending on the rate at which the first pump means 7 can remove the gas from the chamber 1. Similarly, if the mixture has less volatility the vacuum will increase for the same sized pump.

The system 10 provides boiling/evaporation of Aqueous Ammonia in a vacuum against a maximum ambient pressure of 14.7 psia or 1 bar. Ammonia is easily absorbed by water as a percentage by volume of up to 40%. It bonds strongly with water molecules and remains a liquid at ambient temperatures and pressures with some mild evaporation. This invention enables liquid to flow through a vacuum and maintain that vacuum.

In one embodiment, with the first fluid comprising 25% aqueous ammonia at an initial temperature of about 10° C., the vacuum steady state is about 25 inHg (2.42 psia). Even with the same aqueous ammonia solution, these figures will vary depending on the ambient temperature of the incoming first fluid and the capacity of the pumps. The operating vacuum is not a fixed parameter for the general system 10. It is to be noted that the performance of vapour compression air conditioners also varies with ambient temperatures and compressor capacities.

Referring to FIG. 1 there is shown a block diagram of a vacuum cooling system 10. The system 10 includes a first pump means in the form of a positive displacement vacuum pump 7 (which opens up a volume of gas) that has inlet 16 and an outlet 17 which is able to create a vacuum of about 25 inHg (2.42 psia) within the confines of vacuum chamber 1, which is insulated. Apart from the vacuum chamber 1, the system 10 further includes a second pump means 8, a further chamber, called a mixing chamber 3 and an insulated (first) heat exchanger means 2. Evaporative fluid in the form of liquid or aqueous ammonia 25%, being the first fluid, is pumped into vacuum chamber 1 by the second pump means 8 through dispersing means in the form of a nozzle 40, from the mixing chamber 3. The fluid is moved within the conduit 9 from mixing chamber 3. The mixing chamber 3 is approximately at atmospheric pressure or slightly above atmospheric pressure. The first fluid is pressurised to about 10 bar by the second pump 8 to produce a spray of atomised first fluid in the vacuum chamber 1. The second pump means 8 is a means for moving the first fluid 21 into the vacuum chamber 1 through vacuum chamber inlet 71 to replenish the first fluid portion 14 in vacuum chamber 1.

Within vacuum chamber 1 there is a body of liquid 14 (first fluid of reduced concentration) that represents a portion of a first fluid 21 that flows through conduit 9. In the case of aqueous ammonia this solution will be significantly less concentrated than the initial concentration of the first fluid, being a solution of 25% ammonia in one particular embodiment. The liquid 14 is cold as a result of the boiling/evaporation of a significant percentage of its volatile component.

Above the cold liquid solution 14 is a mixture 22 of liquid droplets and gas (ammonia or other volatile fluid) which is a saturated mist. With the first fluid atomised into very small droplets, forming part of the mixed fluid 22, there is significant evaporation from the surface of these droplets, resulting in the release of ammonia gas and the subsequent cooling of the first fluid droplets, which fall by gravity to the bottom or base of the vacuum chamber 1, coalescing into the body of cooled, low concentration mixture 14.

A baffle 41 in a vessel 65 in the vacuum chamber 1 separates the gas 42 (resulting from boiling/evaporation) above the baffle 41 from the mixed fluid 22 below the baffle 41, which is angled downwardly towards, but still above, the nozzle 40. This is to prevent liquid droplets from the mixture 22 from being sucked into vacuum pump 7. A small circumferential gap 60 exists between the baffle 41 and the interior of the chamber 1 to enable the escape of the gas 42 and facilitate its exit from the vacuum chamber 1 via the outlet 11.

The first fluid enters vacuum chamber 1 via nozzle 40 under elevated pressure of around 10 bar from outlet 43 of the positive displacement (diaphragm) pump 8. The nozzle 40 causes the first fluid to atomise creating the saturated mixture 22 which, under the vacuum conditions in chamber 1, instantly flash boils/evaporates to create two components. One component is a volume of gas 42, which is sucked out of vacuum chamber 1 under the influence of vacuum pump 7, while the other component is a reduced concentration cooled liquid 14 (first fluid portion) that is removed from vacuum chamber 1 through outlet 13 by the suction created by the positive displacement pump 4.

The fine mist that appears from the atomizing nozzle 40 results in the mixed fluid 22 of aqueous ammonia and gaseous ammonia which greatly increases the evaporation and boiling of ammonia gas from the overall solution, being the fluid 22 and evaporation from the cold solution 14 of aqueous ammonia, which is a cold reduced concentration liquid. This combination of evaporation and boiling from solution 14 and from the mixed fluid 22, from the actions of the diaphragm pump 7, results in high levels of cooling of the remaining liquid body 14 in the vacuum chamber 1.

The vacuum pump 7 which is water cooled, draws out the evaporated ammonia gas 42 through first outlet 11 at the top of chamber 1 through conduit 12 to the inlet 16 at the pump 7, which is then distributed or pumped out through the outlet 17 of pump 7 and through conduit 18 to arrive back at mixing chamber 3 through the inlet 19 to the mixing chamber 3.

The baffle 41 is inserted above the nozzle 40 at an angle within the chamber 1 in order to prevent any atomised liquid droplets from entering the first outlet 11 and going along conduit 12 to the first pump means 7. As there is a fixed amount of liquid in the overall system 10, it is relatively straightforward to control the level of fluid in the mixing chamber 3, which by default controls the level of the fluid 14 in the vacuum chamber 1. As mentioned previously the second pump means 8, which is a high-pressure diaphragm pump, is used to supply through its inlet 44 and outlet 43 the mixed fluid 21, which is the first fluid, from mixing chamber 3 along conduit 9 to the atomizing nozzle 40. The mixing chamber 3 is fitted with a device which monitors the level in the mixing chamber 3 of the fluid 21 and controls the output of a third pump means, being reciprocating pump 4. The reciprocating cylinder pump 4 is a positive displacement cylinder which strokes up and down inducing a vacuum of around 28 inHg allowing it to evacuate liquid out of the vacuum chamber or evaporator 1 which is at about 25 inHg. The speed of the cylinder stroke is variable so if the level in the mixing chamber 3 of the fluid 21 drops, the reciprocating pump 4 is increased in speed delivering more liquid to the mixing chamber 3. On the other hand, if the level of the fluid 21 is increased in the mixing chamber 3, the pump 4 is slowed to deliver less fluid to the mixing chamber 3. This automatically controls the level of liquid 14 in the vacuum chamber 1.

In an embodiment, the volume of the liquid 14 is maintained at about 2 litres, with 2 litres of fluid per minute entering at nozzle 40 and about 2 litres per minute exiting through outlet 13. The ammonia gas 42 is evaporated and evacuated from the chamber 1 on a continuous basis by the pump 7 and eventually mixes with the liquid body 21 inside the mixing chamber 3. The liquid body is made to be 25% aqueous ammonia solution. It generally has a volume of about 10 litres. The system 10 is totally scalable from small single room units through to large commercial systems that could service whole multi-floor buildings. The volumes of fluids involved would increase or decrease depending on the cooling output required. It is likely that much larger units would have higher COPs than smaller units.

A further pump means in the form of a reciprocating pump 4 is positioned between the mixing chamber 3 and heat exchanger means 2. The concentration of ammonia in the whole body of fluid 14 reduces to between about 10% and 20%, but most preferably to about 14%, as a result of the boiling/evaporation of the saturated mist 22. However the concentration percentage is established when a sample of the fluid is taken and analysed. The concentration of the fluid 14 will be significantly less than that of the first fluid when it is initially pumped into the vacuum chamber 1 from mixing chamber 3. The body of fluid 14 is sucked or drawn through second outlet 13 of chamber 1 and into conduit 23 to be input to the heat exchanger 2 through inlet 24. This is done by the pump 4 by inducing a higher vacuum than that in the evaporator or vacuum chamber 1, the pump 4 being connected to outlet 25 of heat exchanger 2 through conduit 26. A further conduit 30 connects the outlet 28 of reciprocating pump 4 to inlet 29 at the mixing chamber 3.

The concentration of the volatile component, such as ammonia, in fluid 22 is considerably higher than that in fluid 14. Fluid 22 is an atomised mist. The gas 42 boils/evaporates from saturated mist 22 to be drawn out of the vacuum chamber 1 by vacuum pump 7. What remains in the vacuum chamber 1 are droplets of low concentration cold fluid which fall by gravity due to their weight to the bottom of chamber 1 and pool into the liquid 14.

The reciprocating cylinder pump 4 is positioned between the mixing chamber 3 and the heat exchanger 2. Fluid 14 is a low volatile concentration cold liquid which is removed from vacuum chamber 1 via outlet 13 to the chamber 1 by the pump 4, which induces a vacuum level (28 inHg or above) which is higher than that in vacuum chamber 1. This causes the low volatile concentration cold liquid 14 to pass into the heat exchanger 2 via outlet 13 through conduit 23 and inlet 24.

The reciprocating pump 4 has a suction pressure of 28 inHg of vacuum at intake to draw the first fluid or body of fluid 14 out of the heat exchanger 2 via outlet 25 and pressurize it to above 1 bar to be then injected into mixing chamber 3 through inlet 29.

The aqueous ammonia solution that leaves outlet 13 of chamber 1 and enters the heat exchange device 2 has a temperature well below the ambient temperature in an outside environment. As an example, with the ambient temperature at around 10° C., the exhausted liquid exiting through outlet 13 has a temperature of less than −5° C. The solution draws heat out of a second fluid 70, preferably being water, that flows through the heat exchanger 2 between the heat exchanger 2 and a further or second heat exchanger means, in the form of a radiator 5, causing the water to cool with a high degree of efficiency. A temperature gauge can be used or installed between vacuum chamber 1 and heat exchanger means 2 to make such a reading of the fluid temperature exiting through outlet 13. A further pump means in the form of a transfer pump 6 draws the cooled water in the heat exchanger 2 out of outlet 31 through conduit 32 and into inlet 33 of radiator 5. Pump 6 continues circulating the water from the radiator 5 out of its outlet 34 and through conduit 35 through the inlet 36 of pump 6, then the outlet 37 of pump 6 through conduit 38 back into the heat exchanger 2 through inlet 39. This is subsequently cooled again by the ammonia solution flowing through it from the chamber 1. A fan is attached to the radiator 5 in order to blow warm air, in the area being cooled, over the radiator 5. As a result, the air where the radiator 5 is located cools the air substantially. Water leaving the radiator 5 is heated and is then returned to the heat exchanger 2 as described above. The flow of water in the system between the heat exchanger 2 and the radiator 5 is a closed loop. The overall system is also a total closed loop in that no aqueous ammonia or water is lost during the cycle. Ammonia is a non-flammable, non-carcinogenic compound and has no ozone depleting properties. It poses no health risk to humans provided it is in a well ventilated area. Transfer pump 6 generally has a power rating of 10 watts.

The reciprocating pump 4 as mentioned previously pumps the aqueous ammonia solution from chamber 1, which is a cold reduced-concentration liquid ammonia solution as it exits outlet 13. It passes through the heat exchanger 2 and collects heat from the second fluid flowing through the heat exchanger 2. As it exits the heat exchanger 2 via outlet 25, the fluid 14 is warm and low in ammonia concentration. After passing through pump 4 the fluid enters the mixing chamber 3 through its inlet 29. It then joins the body of fluid or solution 21 already in mixing chamber 3 to mix the liquid ammonia solution with ammonia gas that was evacuated from chamber 1 out of outlet 11. The solution 21 becomes a higher concentration liquid solution at about 25% aqueous ammonia again in order to repeat the cycle by being pumped into the vacuum chamber 1 through the pump 8. Thus the ammonia gas from pump 7 enters inlet 19 to the mixing chamber 3 while the reduced concentration of aqueous ammonia from heat exchanger 2 enters inlet 29 to mixing chamber 3 where they both mix in the body of fluid 21 to be output at the outlet 20 and then be delivered along conduit 9 through pump 8 into the nozzle 40 of chamber 1. Thus, the $NH_3$ or ammonia gas is separated from the solution 14 and fluid 22 in chamber 1 and is later joined together and mixed in mixing chamber 3. There is no heat input to the system.

Changes in pressure provide the required changes in phase from liquid to gas and back again.

The vacuum pump 7 as mentioned previously evacuates the ammonia gas 42 from the interior of vacuum chamber 1. The vacuum pump 7 creates a vacuum of about 29 inHg (0.457 psia) when there is no fluid present in the chamber 1. Depending on how volatile the mixture of the first fluid is, its initial temperature and the rate at which the first pump 7 can remove gas the vacuum in the vacuum chamber 1 will reduce as the volatile component is released as a gas. When the valve to the vacuum chamber 1 is opened and pressurised 25% aqueous ammonia solution is injected into the chamber 1, and the vacuum immediately declines to 25 inHg (2.42 psia) due to the rapid evaporation of ammonia out of solution. As the vacuum pump 7 removes this ammonia and diaphragm pump 8 continues to supply fresh 25% ammonia solution, the reciprocating pump 4 removes the reduced concentration liquid ammonia and the temperature of the exhausted liquid from outlet 13 drops to less than minus 5° C. when the ambient temperature is around 10° C.

As the vacuum pump 7 produces waste heat as a result of the friction and work done on the evaporated ammonia gas 42, a water jacket (not shown) forms part of the pump 7 with the heat rejected to the outside atmosphere by a unit 48 which includes a further radiator, a fan (external to remove heat from pump 7) and a further transfer pump for feeding the heated water to radiator 5, to be explained hereinafter. Hot water from the vacuum pump cooling jacket is exited from outlet 52 through conduit 53 and into inlet 54 of the radiator. The cooled water is returned via conduit 50 back to the pump 7 from outlet 49 of the radiator 48 and through inlet 51 of the pump 7. It is however possible to use the heat generated and provide it to the internal space to be heated, which is normally cooled as described above. In this situation it affords the opportunity to include a reverse-cycle feature whereby the original cooling circuit is switched off and only the vacuum pump 7 is operated with the heat of the water rerouted to the indoor radiator 5 to provide heating on colder days. Thus, instead of the heated water being cooled through the radiator 48 it is forwarded through a further outlet 55 of the radiator 48 through conduit 56 to inlet 57 of the radiator 5. The cooled water from radiator 5 exits outlet 45 and through conduit 46 is returned to the pump 7 through inlet 47.

Figure 2:
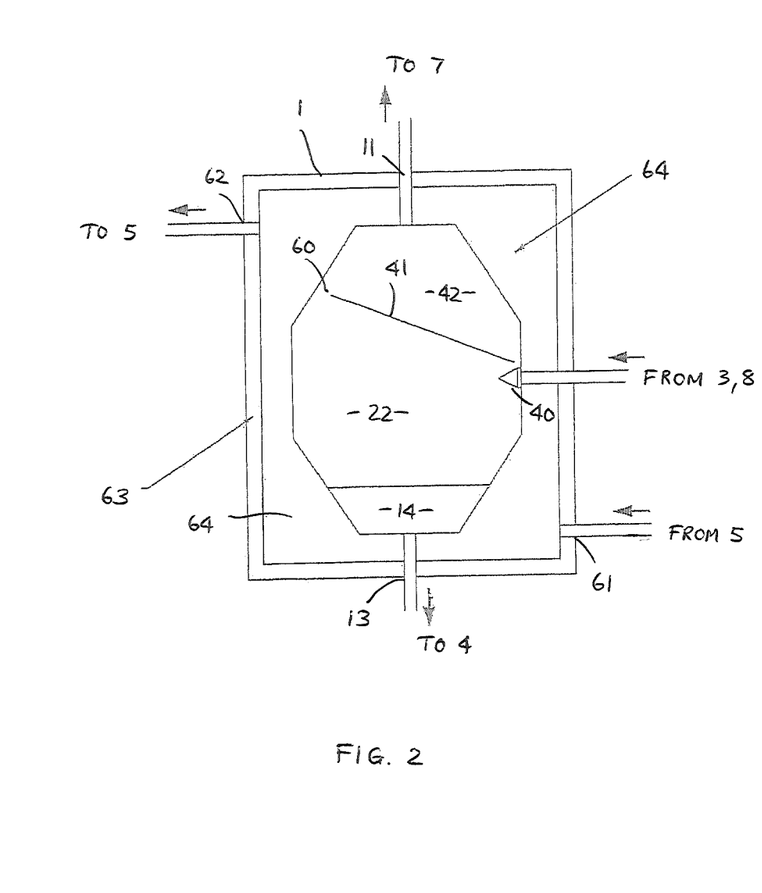
FIG. 2 is a view showing a further embodiment of the vacuum cooling system of FIG. 1 with a heat exchanger unit forming part of a vacuum chamber of the cooling system.

In FIG. 2 there is shown an alternative embodiment to the system of FIG. 1 and in particular to vacuum chamber 1 and the heat exchanger 2. In FIG. 2 the heat exchanger 2 is effectively combined with the vacuum chamber 1. Thus instead of having the separate heat exchanger 2 of the embodiment shown in FIG. 1, warm water emanating from the radiator 5 at outlet 34 will be directly input to inlet 61 at the bottom of the chamber 1 and what is called a water jacket 64 that surrounds the vessel 65 which contains the ammonia solution in its various liquid and gaseous states. Thus warm water is input to the jacket 64 at inlet 61 is then cooled by its contact with the outside wall of the vessel 65, is the chamber 1 having an insulated outer wall 63, and output through outlet 62 at the top of the chamber 1 to be directed to the inlet 33 of radiator 5 to then cool the room in which the radiator 5 is located. The other aspects of the system are similar to what is disclosed in FIG. 1, in that the solution from mixing chamber 3 is still input to the nozzle 40, while pumped by pump 8 and gaseous ammonia 42 exits through outlet 11. The cooled or cold solution 14 is removed through outlet 13 and directed to the mixing chamber 3 through the pump 4. The pump 6 continues to pump the water exiting from outlet 62, through the radiator 5, and back to the inlet 61.

Figure 3:
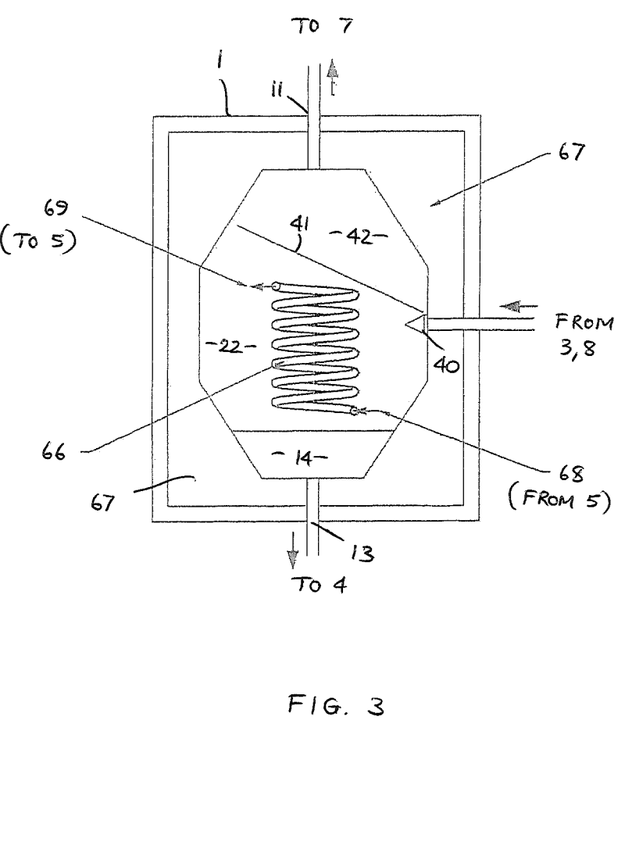
FIG. 3 is a view showing an even further embodiment of the vacuum cooling system of FIG. 1 with a heat exchanger unit forming part of a vacuum chamber of the cooling system.

With regard to FIG. 3 there is shown a further different embodiment to the heat exchanger 2 and vacuum chamber 1 disclosed in FIG. 2. Rather than the water from radiator 5 circulating between the vessel 65 and wall 63 of chamber 1, a dedicated heat exchange unit 66 is installed in area 22 inside vessel 65 which is a mixed liquid and gaseous form of ammonia which was provided through nozzle 40. Insulation 67 completely surrounds the vessel 65 rather than having the jacket 64 of FIG. 2. The apparatus 66 is effectively a coil which is hollow to allow entry at inlet 68 of warm water from the radiator 5, as described before, and an outlet 69 to return the cold water to radiator 5. As the mixed fluid 22 is a cool or cold fluid, this cools the coil 66 so that the water exiting at outlet 69 is much cooler than the temperature of the water entering at inlet 68. As before the pump 6 operates to pump the water to the inlet 68 and suck the water out from outlet 69 through to the radiator 5 to continue with that separate cycle. As before the cold solution 14 exits outlet 13 while the gaseous ammonia 42 exits outlet 11 directed by the displacement pump 7. Fluid from the mixing chamber 3 is pumped to the nozzle 40 as before.

The main unit for the cooling device is located outside of the space to be cooled with the pipes delivering cooled water to registers inside the space to be cooled, so that should an ammonia leak occur it would be outside of the dwelling and will be quickly dispersed. Thus the radiator 5 and possibly the pump 6 can be located inside the dwelling with part of the conduits 32 and 35 inside the dwelling. The remainder of the system would be located outside of the dwelling.

The energy required to create a vacuum against atmospheric pressure of 14.7 psia is much less than is required in a vapour compression unit where compressor pressures can be 300 psig. Theoretical calculations show that this unit or system will have a COP equal to or greater than conventional air-conditioners. It is inexpensive to produce and its relatively simple design should be maintenance and trouble free.

The general arrangement of components shown in FIG. 3 by the system 10 can be varied. For example the heat exchanger unit 2 could be incorporated into the vacuum chamber 1 which simplifies the design and layout. The positive displacement pump 7 could be a piston crank arrangement similar to a conventional air-compressor, but with valving that delivers a vacuum or a rocking piston arrangement with an air cylinder attached to a crank which reduces side loading. Due to the low pressures involved, the pump 7 could be made of a plastic material and therefore be cheaper to produce with simpler seals and little or no lubrication required. Also, as a result of the low pressures, the work performed on the ammonia gas by the pump 7 is consequently also low and at this point there appears to be no requirement for a cooling unit for the mixing chamber 3. In larger systems, or when working with very high ambient temperatures, this however may be required.

The positive displacement pump 7 can be a small compressor head with valving that allows it to act as a vacuum pump. It requires a 550 watt motor running at around 450 watts of consumed power. Larger versions of the system would require larger pumps consuming more energy however the relationship would not be linear. A system twice the capacity of the current prototype could use the same vacuum pump and motor providing an even higher COP. Friction and work performed on the evaporated gas means that waste heat is generated and though there is scope to produce a cheaper plastic version that may not need lubrication, the most practical solution is to use reconfigured air compressors which are readily available and cost effective.

The fluid used to achieve cooling in the system 10 is 25% aqueous ammonia, however many other different solutions and mixtures including other ratios of aqueous ammonia, aqueous solutions containing other gases such as carbon dioxide or chlorine, and solutions of multiple components will produce cooling with varying degrees of efficiency and associated risk.

Single component compounds such as hydrocarbon based solvents or other refrigerant chemicals will also work but the criteria for cooling fluid selection is that they must be liquid at normal temperatures and pressures, but have a volatile component or components that easily evaporate at medium vacuum levels.

Aqueous ammonia is cheap and readily available. Its volatile component ammonia is widely used in commercial refrigeration systems as it has the highest latent heat of evaporation (LHE) next to water. It is non-corrosive to steel and most plastics that allows great flexibility in the choice of system components. Furthermore, ammonia has no properties that will contribute to global warming or ozone layer depletion and makes it an ideal refrigerant.

Used in a split system with the main components located outside the area to be cooled in open air, should a leak occur, it will quickly dissipate as the gas is lighter than air and is only harmful if allowed to build up in an enclosed space. No aqueous ammonia or ammonia gas flows in the pipes that enter the space to be cooled. Only cooled water enters such an interior space.

Ammonia can be flammable under extreme conditions of concentration and heat which could not occur with the main unit outside and the fact that during most of the cycle it is held in a solution containing a high percentage of water.

Other percentages of ammonia in aqueous solution can be used other than 25%, either higher or lower such as 10% to 40% ammonia in water, however at 40% the solution can become unstable. Other liquids with similar properties to aqueous ammonia can be used. Different first fluids or percentages of the volatile component may alter the vacuum pressures within the system.

Volumes described in the description for the vacuum chamber 1 and mixing chamber 3 can be modified depending on the cooling capacity of the unit. Larger pumps for bigger installations than the one described would be required.

The invention claimed is:

1. A vacuum cooling system having a first fluid and a second fluid circulating through the vacuum cooling system in separate cycles, said vacuum cooling system comprising:
   a vacuum chamber containing a portion of said first fluid and a volume of gas evaporated from said first fluid portion;
   a first pump for removing the gas volume from the vacuum chamber to create a vacuum in said vacuum chamber;
   second pump operative for pumping said first fluid into said vacuum chamber to replenish the first fluid portion in said vacuum chamber;
   a mixing chamber located between the first pump and the vacuum chamber for receiving said first fluid that passes through the heat exchanger and for receiving the gas volume from the first pump, said first fluid and said gas volume being mixed in said mixing chamber; and
   a heat exchanger for cooling said second fluid over which air is blown in order to cool the air in a space,
   wherein said first fluid has a different composition to said second fluid and said first fluid includes a volatile component.

2. The vacuum cooling system as recited in claim 1, further comprising a nozzle for atomising the first fluid to assist in creating the gas volume and evaporating the gas volume from the vacuum chamber.

3. The vacuum cooling system as recited in claim 2, further comprising:
   a conduit that connects the vacuum chamber to the first pump; and
   a baffle located in a vessel within the vacuum chamber, said baffle preventing atomised droplets of the first fluid from entering said conduit.

4. The vacuum cooling system as recited in claim 1, wherein said heat exchanger forms part of said vacuum chamber.

5. The vacuum cooling system as recited in claim 1, wherein said heat exchanger is separate and external to the vacuum chamber.

6. The vacuum cooling system as recited in claim 1, wherein the first fluid portion exits the vacuum chamber in a cooled state and enters the heat exchanger to cool said second fluid.

7. The vacuum cooling system as recited in claim 1, wherein the second pump is located between an outlet of the mixing chamber and an inlet to the vacuum chamber.

8. The vacuum cooling system as recited in claim 7, further comprising a third pump located between the vacuum chamber and the mixing chamber for moving said first fluid portion from said vacuum chamber to the mixing chamber.

9. The vacuum cooling system as recited in claim 8, further comprising a radiator for receiving the second fluid which is cooled by the first fluid portion entering the heat exchanger, wherein the cooled second fluid is passed through the radiator to cool said air in said space when air is fanned or blown over the radiator.

10. The vacuum cooling system as recited in claim 9, further comprising a transfer pump located between the radiator and the heat exchanger for moving said cooled second fluid from said heat exchanger and through said radiator.

11. The vacuum cooling system as recited in claim 10, wherein, under the operation of the second pump, the first fluid enters the vacuum chamber at said vacuum chamber inlet after leaving said outlet of the mixing chamber, wherein a portion of said first fluid is converted into a mixed fluid of droplets and a gas and then into said gas volume.

12. The vacuum cooling system as recited in claim 11, wherein the gas volume in the vacuum chamber is expelled through a first outlet of the vacuum chamber to enter an inlet to the first pump, and thereafter proceeds through an outlet of the first pump to be input to a first inlet of the mixing chamber to be mixed with the first fluid portion that exits through a second outlet of said vacuum chamber.

13. The vacuum cooling system as recited in claim 12, wherein the first fluid portion leaves the vacuum chamber through said second outlet of said vacuum chamber in a cooled state and into a second inlet of the mixing chamber under the action of the third pump.

14. The vacuum cooling system as recited in claim 13, wherein said second fluid circulates between the heat exchanger and the radiator under the action of the transfer pump, whereby said second fluid enters said heat exchanger, is then cooled by the first fluid portion after exiting the second outlet of the vacuum chamber, and exits from the heat exchanger to be received at an inlet to the radiator, thereafter said second fluid exits from an outlet to the radiator and enters an inlet to the transfer pump and proceeds through an outlet of the transfer pump to the heat exchanger to complete a respective cycle.

15. The vacuum cooling system as recited in claim 1, wherein the first fluid is aqueous ammonia and when the first fluid enters the vacuum chamber the first fluid includes 25% ammonia or a similar fluid mixture containing a volatile component.

16. The vacuum cooling system as recited in claim 1, wherein said first fluid includes 10% to 40% ammonia or a fluid with other mixtures containing a volatile component.

17. A vacuum cooling method in a system having a vacuum chamber, a heat exchanger, a first pump, a second pump, a first fluid and a second fluid circulating through the system, said second fluid moving in a cycle separate to that of the first fluid, said first fluid having a different composition to said second fluid and said first fluid including a volatile component, said method comprising the steps of:
  evaporating a portion of said first fluid in said vacuum chamber to produce a volume of gas inside said vacuum chamber;
  operating said first pump to remove said volume of gas from the vacuum chamber to create a vacuum in said vacuum chamber;
  operating said second pump to move said first fluid into the vacuum chamber to replenish the first fluid portion in said vacuum chamber;
  providing a heat exchanger to cool said second fluid over which air is blown in order to cool the air in a space; and
  mixing said first fluid and said gas volume in a mixing chamber located between the first pump and the vacuum chamber, said mixing chamber receiving said first fluid that passes through the heat exchanger and receiving the gas volume from the first pump.

18. The vacuum cooling method as recited in claim 17, further comprising the step of withdrawing the first fluid portion from the vacuum chamber in a cooled state to enter the heat exchanger to cool said second fluid.

19. The vacuum cooling method as recited in claim 18, further comprising the steps of providing a radiator and circulating said second fluid between the heat exchanger and the radiator, passing the cooled second fluid through the radiator to cool said air in said space.

* * * * *